Figure 1:
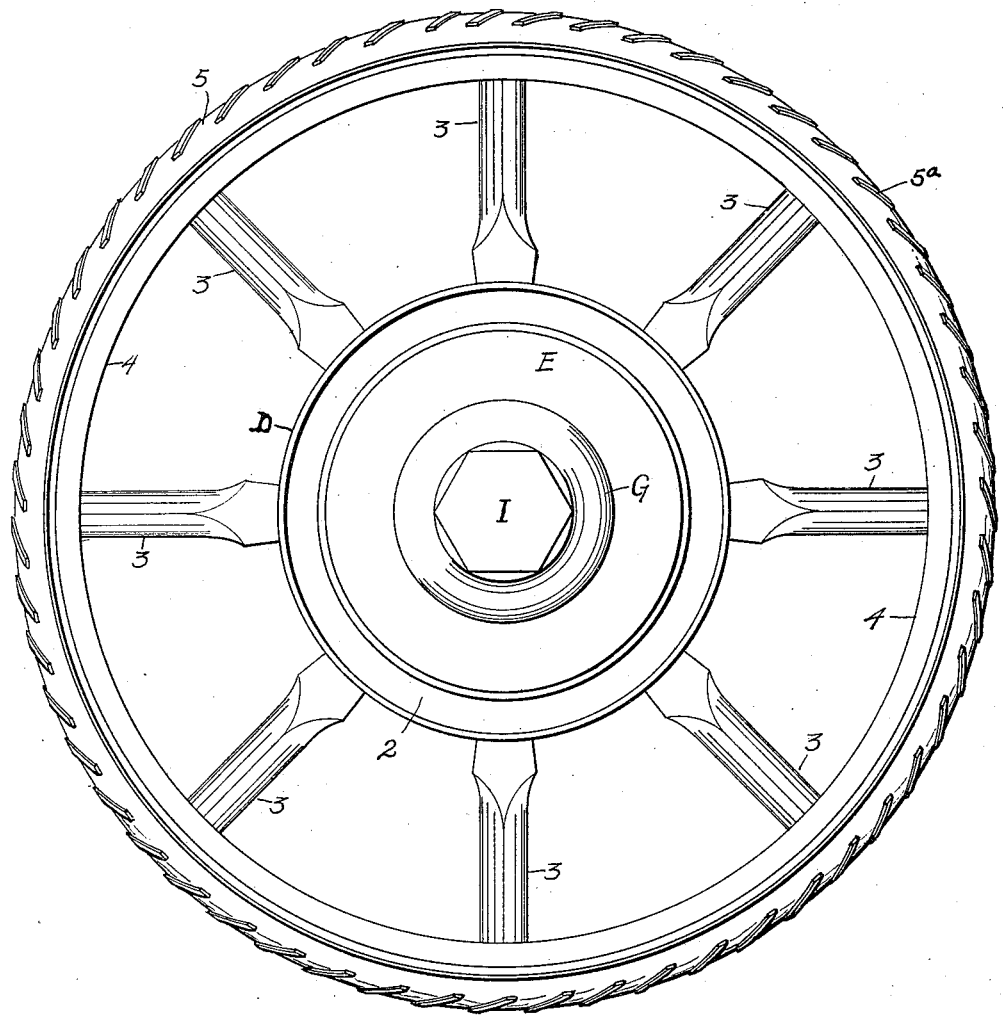

J. S. HINES.
VEHICLE WHEEL.
APPLICATION FILED JAN. 24, 1912.

1,052,250.

Patented Feb. 4, 1913.
3 SHEETS—SHEET 1.

WITNESSES
Roy E. Fryar
R. E. Randt

John S. Hines,
INVENTOR;
By Robert W. Faudle,
ATTORNEY.

J. S. HINES.
VEHICLE WHEEL.
APPLICATION FILED JAN. 24, 1912.
1,052,250.
Patented Feb. 4, 1913.
3 SHEETS—SHEET 2.
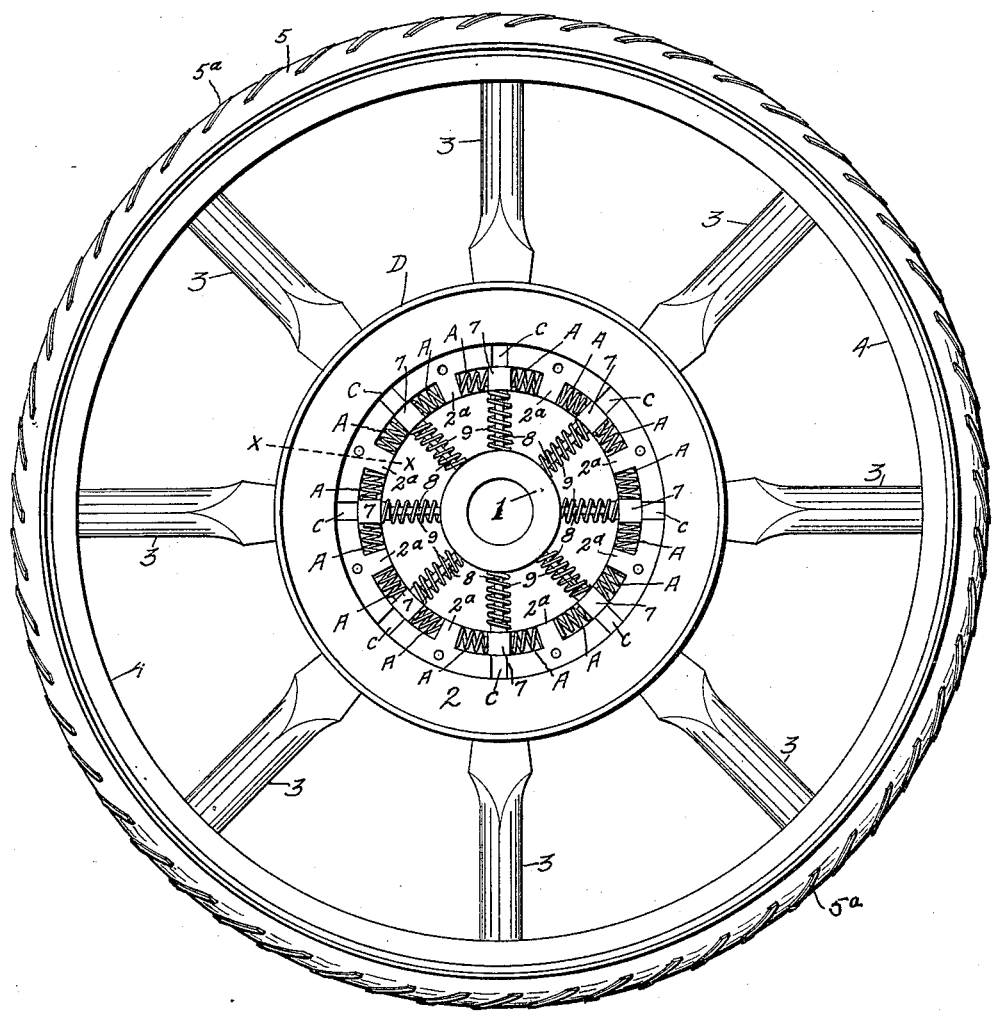
Fig. 3.
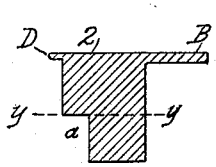
Fig. 4.
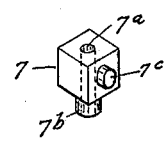
Fig. 5.
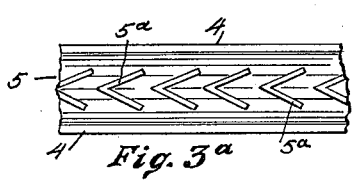
Fig. 3ª
WITNESSES
Roy C. Fryar
R. E. Randle
John S. Hines,
INVENTOR;
By Robert W. Fauell,
ATTORNEY.

J. S. HINES.
VEHICLE WHEEL.
APPLICATION FILED JAN. 24, 1912.

1,052,250.

Patented Feb. 4, 1913.

3 SHEETS—SHEET 3.

WITNESSES
Roy E. Fryar
R. E. Randle

John S. Hines,
INVENTOR.
By Robert W. Randle
ATTORNEY.

UNITED STATES PATENT OFFICE.

JOHN S. HINES, OF PORTLAND, INDIANA.

VEHICLE-WHEEL.

1,052,250. Specification of Letters Patent. Patented Feb. 4, 1913.

Application filed January 24, 1912. Serial No. 673,268.

*To all whom it may concern:*

Be it known that I, JOHN S. HINES, a citizen of the United States, residing in the city of Portland, in the county of Jay and State of Indiana, have invented a new and useful Vehicle-Wheel, of which the following is a full, clear, and accurate specification and exposition, being such as will enable others to make and use the same with absolute exactitude.

My present invention relates to spring wheels for vehicles which are particularly intended for automobiles or other motor vehicles, and among the many objects thereof are the following:

Broadly speaking my object is to provide a self-contained spring wheel for vehicular traffic, which is so constructed as to equal or exceed the resiliency of pneumatic tires, and to be vicarious with relation thereto, yet at the same time employing solid rubber, or cushioned, tires in the periphery thereof.

Further objects of my invention are to provide a resilient vehicle wheel having a maximum of efficiency with a minimum of mechanical parts, which will be strong and durable in construction, in which all of the parts will be easily accessible, having a maximum of resiliency in use, and which can be manufactured and sold at a comparatively low price. And, more specifically stated, my object is to provide a vehicle wheel particularly intended for automobiles, whereby the weight carried by the wheel will be supported on a plurality of helical springs located around inside the wheel and near the hub thereof being disposed in such manner that the coherent total of all will afford the proper predetermined degree of resiliency in order to absorb the jars and jolts incident to the travel of the wheel over an uneven roadway.

Other objects and particular advantages of my invention will be brought out and be made apparent to the mechanician in the course of the following description, and that which is new and which constitutes substantive improvements will be correlated in the appended claims.

The preferred means for carrying out the principles of my invention in a practical manner is shown most clearly in the accompanying three sheets of drawings, in which—

Figure 2:
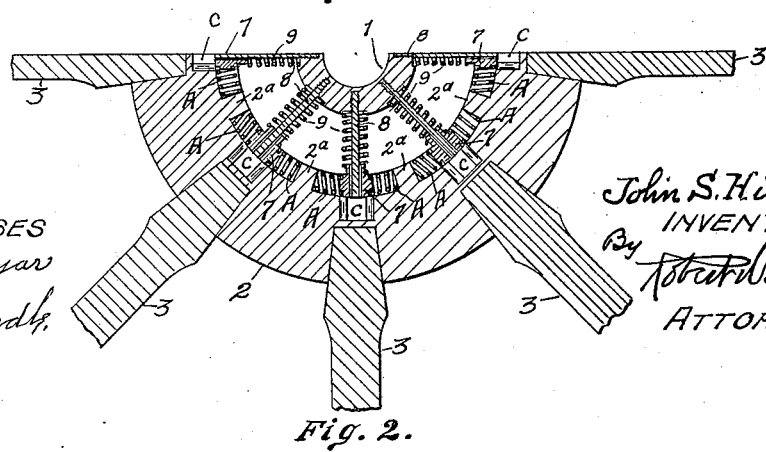
Figure 6:
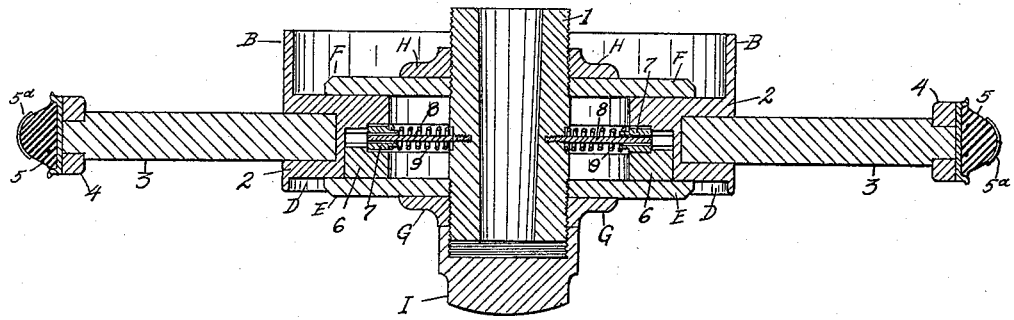
Figures 7, 9:
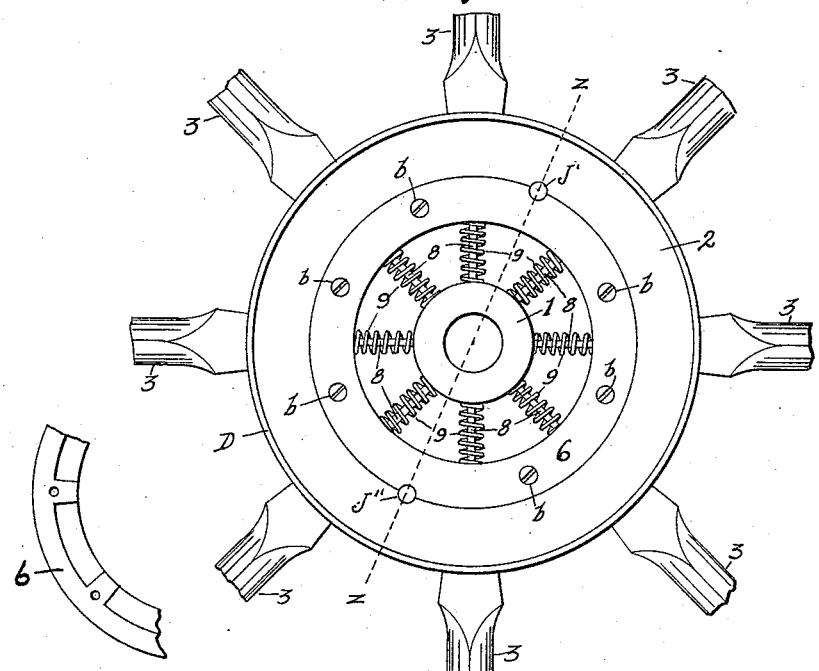
Figure 8:
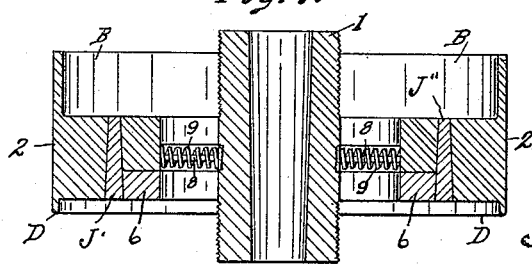

Figure 1 is a front face view of my wheel complete ready for operation. Fig. 2 is a central circumferential section of one half of my wheel. Fig. 3 is a front elevation of my wheel as it would appear with the front disk and the ring removed. Fig. 3$^a$ is a plan view of a portion of the periphery of the wheel. Fig. 4 is a detail cross section of the main portion of the outer hub, as taken for instance on the line $x$—$x$ of Fig. 3. Fig. 5 is an isometrical detail view of one of the floating-heads. Fig. 6 is a central cross section, taken through the wheel. Fig. 7 shows the central portion of the wheel with the disk removed, also showing a slightly modified form of construction from that shown in the previously mentioned views. Fig. 8 is a central cross section taken through the parts shown in Fig. 7, and as taken on line $z$—$z$ of Fig. 7. And Fig. 9 is a detail showing a fragment of a portion of the under side of the band 6.

Similar indices denote like parts throughout the several views of the three sheets of drawings.

In order that the construction and the operation of my invention may be more fully understood I will now take up a detail description thereof in which I will set forth the construction and operation thereof as briefly and as comprehensively as I may.

Referring first to the views showing the preferred construction, numeral 1 denotes an inner or ordinary hub adapted to revolve on a spindle. Disposed around concentric with and located some distance from the inner hub 1 is the outer hub, comprising the main member 2 which is in the nature of a ring whose cross section is as that shown in Fig. 4. Secured in and radiating from the periphery of the member 2 are a plurality of outer spokes 3; and mounted on the outer ends of said spokes 3 is the rim 4, which latter carries an ordinary solid rubber or cushioned tire 5. The surface of said tire 5 is formed with raised angular or deltoid-shaped tread facets 5$^a$. Fitting around on one side of the outer hub 2 (that is adapted to fill the notch $a$ shown in Fig. 4) is the ring 6 which may be secured in place by screws $b$, or otherwise as desired. Formed around in the center of the inner edge of the hub member 2 is a channel which is divided into a plurality of compartments or sections by means of the several abutments 2$^a$. The depth of said channel or compartments is substantially the same as one-half of the width of the ring 6, while its thickness is substantially the same as is its depth. From the center of each division of said channel and opposite each spoke 3 there extends out a cavity *c* whose depth extends out even with the periphery of the ring 6, as shown in Fig. 3.

A plurality of floating heads 7 are provided, corresponding in number to the number of spokes 3, one of said heads being located in each of the divisions of said channel in the outer hub and they are adapted to move laterally therein. Each of said floating heads is formed substantially as that shown in Fig. 5, same being in the nature of a substantially square block having a central aperture 7ª therethrough. Formed on one end of said head and extending out around and concentric with said aperture 7ª is the collar 7ᵇ through which said aperture also extends. Extending out from two opposite sides of said head, at right-angles to the aperture 7ª, are the oppositely disposed lugs 7ᶜ.

Rigidly secured in and extending out radially from around the central portion of the hub 1 are the comparatively small or inner spokes 8 which correspond in number to the number of spokes 3. The outer end portions of the inner spokes 8 are located in the respective apertures of the respective floating heads 7 and in which they may freely operate, or more properly speaking, the head may operate radially on the respective spokes, the ends of said spokes 8 being adapted to enter the respective cavities *c*. Each of the floating heads 7 is retained resiliently at its outer limit by means of the respective helical springs 9 which surround their respective spokes 8 with their outer ends surrounding the respective collars 7ᵇ, and with their inner ends seated in suitable cavities formed in the periphery of the hub 1. Each of the floating heads 7 is normally and resiliently retained in the center of its division of said channel by means of two helical springs A, all of which are identical with each other, the only difference being is that each alternate one presses to the right while the others press to the left with an equal force, the springs A being located substantially at right angles to springs 9. Extending inward and at right-angles to the periphery of the outer hub 2 is the brake-drum B; and projecting out from the opposite face of the hub 2 is the flange D.

Letter E denotes an outer disk, and F refers to the inner disk, the two being substantially alike except that they are oppositely disposed with relation to each other. Said disks are adapted to contact with the respective front and rear faces of the outer-hub, leaving the inner hub free to move radially. Said disks are adapted to fit snugly around on the hub 1 as shown, and to be retained in place by the respective angular rings G and H which are threaded around on the periphery of the hub 1 as shown.

Letter I denotes a cap which may cover the end of the hub 1, being threaded thereon, and contact with the ring G in such manner as to hold the same in place.

After the several elements have been arranged as shown and as set forth it will be apparent that I provide a wheel wherein all of the parts will work together with perfect synchronism and with absolute exactitude.

The proportionate weight of the vehicle and its load will of course all come upon the hub 1, and therefore when the wheel is on the ground in the usual manner the said weight will be carried by certain of the springs 9 and A at one time, the weight being borne by all of the springs in succession, each complete revolution of the wheel employing in turn all of said springs. At any given position the weight will manifestly be carried by the lower vertical spring 9 and the two like springs located on each side thereof, and also by certain of the side springs A. It should be noticed that by means of my construction the hub 1 may be moved radially (that is at right-angles to the axial direction of the wheel) in any direction without necessarily moving the outer portion of the wheel at all, or in other words,—the outer portion of the wheel may be moved radially, at right angles to the inner hub, while the inner hub 1 remains relatively stationary. It is also apparent that if either of said movements be made that when released the springs will almost instantaneously return the several parts back to their normal positions, that is with the inner hub concentric with the outer hub, thereby accomplishing the desideratum of this invention.

A slight modification of the construction described may be made by dividing the member 2 into two parts, as on line *y—y* of Fig. 4, which is the arrangement shown in Figs. 7 and 8, wherein the ring 6 is secured to the smaller portion of member 2. In this modification the smaller portion of member 2 together with the ring 6 is free to slide through the larger portion of member 2, being prevented from revolving therein by means of two loose keys J′ and J″. Said keys are retained in place by the disks E and F, when the wheel is assembled. With this construction it is apparent that certain portions of the outer hub, together with the spokes 3, the rim 4, and the tie 5, may be removed simply by first unscrewing the cap I, the angular ring G, and then removing the disk E.

I desire that it be understood that various changes may be made in the several details of construction from that herein shown and described without departing from the spirit of my invention and without sacrificing any of the advantages thereof.

Having now fully shown and described my invention and the best means for its construction known at this time, what I claim and desire to secure by Letters Patent of the United States, is—

A spring wheel comprising in combination a central hub, an outer hub located around and normally concentric with the central hub, there being a plurality of compartments formed around in the middle of the inner edge of the outer hub, a plurality of floating heads 7, one of which is located in each of said compartments, each of said heads being in the nature of a block having a central aperture $7^a$ therethrough, a collar $7^b$ on said head through which said aperture also extends, lugs extending out from two opposite sides of said head at right angles to said aperture $7^a$, a plurality of inner spokes 8 rigidly secured in and radiating from around the central hub to the outer ends of each of which one of said heads is slidably connected in such manner as to allow the spoke to operate radially in its head, a helical spring surrounding each of said spokes with one end resting on the inner hub and the other end disposed around the collar and resting against the head and normally pressing its head outward, a pair of comparatively small helical springs for each head same being located on each side of said head and in the respective compartments and at right-angles to the first mentioned springs and each having one of its ends disposed around a lug of the head with its other end seated against the wall of said compartment to hold the head central thereof, all substantially as shown and described.

In testimony whereof I have hereunto subscribed my name to this specification in the presence of two subscribing witnesses.

JOHN S. HINES.

Witnesses:
R. W. RANDLE,
R. E. RANDLE.

Copies of this patent may be obtained for five cents each, by addressing the "Commissioner of Patents, Washington, D. C."